J. M. ADAMS.
Hoe.
No. 25,862.
Patented Oct. 18, 1859.
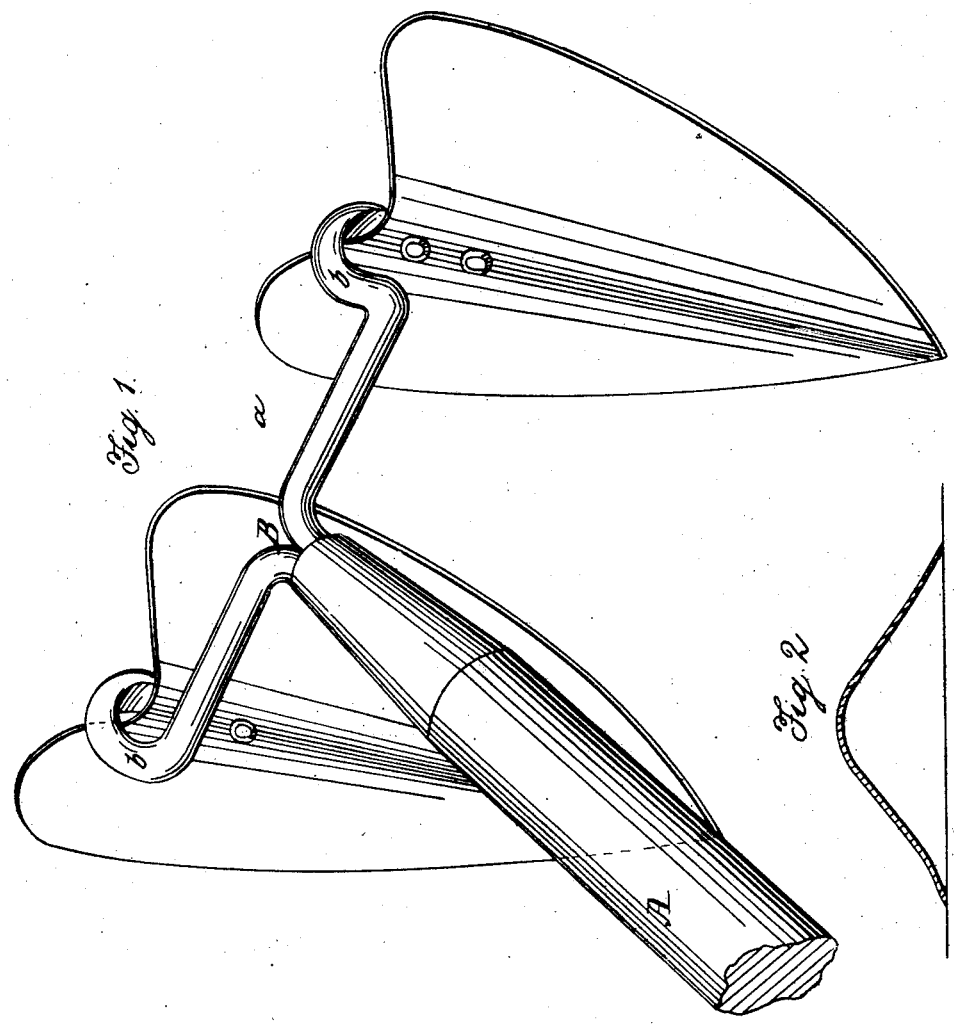
Witnesses:
Thos. P. Roach
Thos. L. Glover
Inventor:
James M. Adams

UNITED STATES PATENT OFFICE.

JAMES M. ADAMS, OF CANTON, MASSACHUSETTS, ASSIGNOR TO HIMSELF AND ALONZO JOHNSON, OF SAME PLACE.

IMPROVEMENT IN WEEDING-HOES.

Specification forming part of Letters Patent No. 25,862, dated October 18, 1859.

*To all whom it may concern:*

Be it known that I, JAMES M. ADAMS, of Canton, in the county of Norfolk and State of Massachusetts, have invented a new and Improved Convex Cultivating and Weeding Hoe, of which the following is a full, clear, and exact description, reference being had to the accompanying drawings, making part of this specification, in which—

Figure 1 is a view of my improved hoe; Fig. 2, a transverse section through one of the blades.

I am aware that a weeding-hoe has been made in which two or more flat triangular pieces were joined together to form the hoe; but such a form of tool is found to be objectionable on account of its liability to clog or choke with weeds and grass.

The object of my present invention is to construct a hoe for weeding and cultivating the ground which, while it presents a large amount of cutting-edge, and is of a form that will easily enter the ground to cut the roots of the weeds, will also lighten and loosen up the soil at the same operation.

That others skilled in the art may understand and use my invention, I will proceed to describe the manner in which I have carried it out.

In the drawings, A is the handle, in the end of which is inserted a bifurcated shank, B, to the end of each arm $b$ of which is riveted or otherwise secured a blade of sheet-steel of the form shown. The two blades are placed at a short distance apart, leaving a space, $a$, between them through which the dirt and weeds pass without choking the tool and interrupting its operation. Each blade is formed, as in Fig. 2, with its upper surface convex, and with its edges ground down to make it cut. This convex form, as the tool is operated, serves to lift and loosen the soil at the same time that the roots of the weeds and grass are cut off, thus cultivating and weeding the land at the same operation in a more effectual manner and with less labor than can be done with any other hoe with which I am acquainted.

What I claim as my invention, and desire to secure by Letters Patent, is—

The arrangement of the two blades with the bifurcated handle, the whole being constructed in the manner and for the purposes herein set forth.

JAMES M. ADAMS.

Witnesses:
THOS. R. ROACH,
THOS. L. GLOVER.